(No Model.)

J. C. HOSHOR.
BELT COUPLING.

No. 587,966. Patented Aug. 10, 1897.

WITNESSES:
F. L. Bottum
George H. Utley.

INVENTOR.
JOSEPH C. HOSHOR,
BY Franklin Scott, ATTORNEY.

UNITED STATES PATENT OFFICE.

JOSEPH C. HOSHOR, OF BROCKPORT, NEW YORK.

BELT-COUPLING.

SPECIFICATION forming part of Letters Patent No. 587,966, dated August 10, 1897.

Application filed January 17, 1896. Serial No. 575,818. (No model.)

*To all whom it may concern:*

Be it known that I, JOSEPH C. HOSHOR, of Brockport, in the county of Monroe and State of New York, have invented an Improved Belt-Coupling, of which the subjoined description, in connection with the accompanying drawings, constitutes a specification.

This invention is designed to be used in coupling belts, where the ends of the belt are squarely cut off and then abutted together, by passing the ends of a series of short coupling-links through a corresponding series of perforations in the ends of the belt, so that they protrude above the outside of the belt far enough to pass a rod or wire transversely through holes made therefor in the ends of the links, whereby the working strain on the belt in operation is evenly distributed over the entire width of the belt and is not confined to the portions opposite the holes which receive the ends of the couplings.

Figure 1:
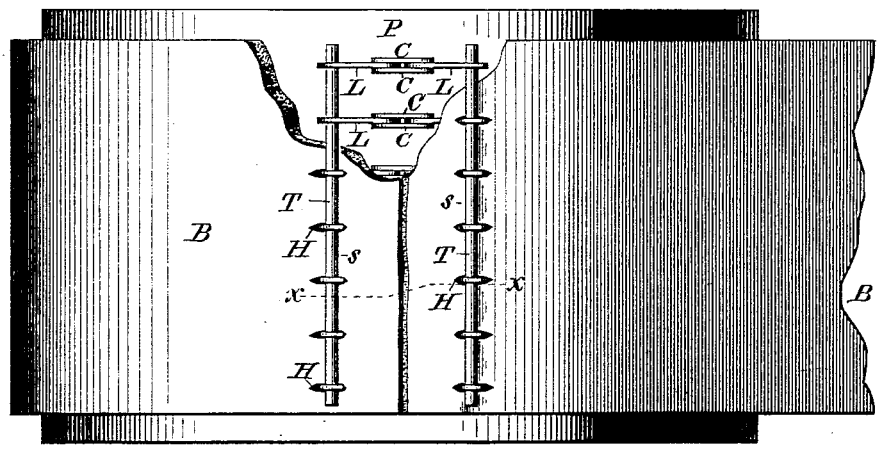
Figure 2:
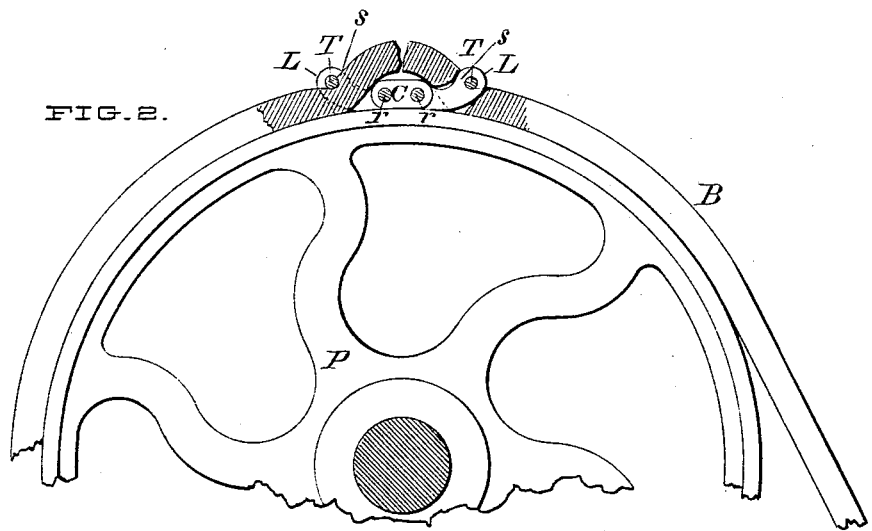

This invention as applied to an ordinary belt in operation is shown in the drawings, in which in Figure 1 a plan view of the coupling is shown. Fig. 2 shows an edge view of the belt, the sectional parts being taken from Fig. 1 on the line $x\ x$.

Heretofore the ends of belts have been united by hooks of various kinds and by various rigid metallic connections, none of which would yield or conform to the curvature of pulleys of small diameter as they passed over them, and as a consequence the contact of the surface of the belt with that of the pulley would be broken for a considerable distance each side of the coupling and thus the driving hold of the belt on the pulley would be weakened. It is one object of this invention to obviate this objection to rigid hooks or couplings by making the coupling in two or more members and uniting them with a hinge-joint or by means of links, so that as the coupling passes around a small pulley it can yield to the curvature and thereby let the belt down onto the surface of the pulley.

My invention includes a series of couplings, a pair of binding-rods, and a transverse series of longitudinal perforations in the ends of the belt. The style of coupling here illustrated is composed of the two gripping-links L L and the connecting-links C C. These are joined, as seen in Fig. 1, by means of the pivot-pins $r\ r$. (Seen in Fig. 2.) The links L are curved substantially as shown, so that the ends can pass through the belt on as nearly a diametrically transverse line as possible. The outer end of each link L is perforated with a hole for the reception of the binding-rod T. The space between the rods T and the ends of the links C C is only sufficient for the passage of the thickness of the belt, and in practice it is the design to have the spaces and parts so proportioned that the tensile or draft strain on the rods T will press the belt underneath them down closely to the surface of the pulley. Each end of the belt is perforated with a series of short slits H for the reception of the ends of the links L.

In practice after the ends of the belt are slitted for the ends of the coupling-links they are entered therein and the rods T are passed through the eyes in the links. This establishes the connection of the ends of the belt, but there is a tendency of the ends of the belt to stick up, and the rods T will incline to lie on the surface of the belt. These objectionable features are overcome by wetting the ends of the belt and crimping down the ends, and as the wetting softens the leather, where leather is used, there is no difficulty in embedding full half the dimensions of the rods T into the material of the belt, as seen in the drawings. This feature, which is a result due in part to manipulation and in part to the strain from use, raises a transverse ridge along one side of the rods upon which all the strain of use is transferred, so that in practice the tension is taken almost wholly off the edges of the links where they pass through the holes in the belt. The joints in the coupling favor the belt hugging the pulley at every available point, and the strain put on the belt in use tends to press it still closer to the pulley than otherwise would be the case.

The several link members of this coupling are made from metal plate, and they are set so that they will stand edgewise on the pulley-surface. This construction is to aid and promote the embedding of the binding-rod into the outer surface of the material of the belt, and the binding-rods are also made large and strong enough not to yield or spring under the tension put upon them. This overcomes the defects and weaknesses in that respect which are characteristic of analogous devices made from wire.

I therefore claim as my invention—

1. A belt-coupling consisting of two flat metallic links set on edge each adapted to be passed through a slit in the belt, connected by an interposed flat metallic pivoted link, likewise set on edge and a rigid fastening pin or rod adapted to pass through a hole in each link on the upper side of the belt.

2. The combination of the two links, the intermediate connecting-links pivoted as shown, and the two rigid binding-rods, said links being set on edge and adapted to operate substantially as specified.

In testimony whereof I have hereto subscribed my name this 18th day of December, A. D. 1895.

JOSEPH C. HOSHOR.

Witnesses:
DUDLEY C. BROWN,
BURT MERRITT.